(12) United States Patent
Kishimoto

(10) Patent No.: US 11,271,923 B2
(45) Date of Patent: Mar. 8, 2022

(54) INFORMATION PROCESSING APPARATUS, AUTHORIZATION SYSTEM, AND VERIFICATION METHOD

(71) Applicant: CANON KABUSHIKI KAISHA, Tokyo (JP)

(72) Inventor: Ryo Kishimoto, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 238 days.

(21) Appl. No.: 16/550,535

(22) Filed: Aug. 26, 2019

(65) Prior Publication Data
US 2020/0076791 A1 Mar. 5, 2020

(30) Foreign Application Priority Data
Aug. 30, 2018 (JP) .............................. JP2018-162103

(51) Int. Cl.
*H04L 29/06* (2006.01)
*H04L 9/08* (2006.01)
*H04L 9/32* (2006.01)

(52) U.S. Cl.
CPC ........ *H04L 63/0807* (2013.01); *H04L 9/0825* (2013.01); *H04L 9/3213* (2013.01);
(Continued)

(58) Field of Classification Search
CPC ............. H04L 63/0807; H04L 63/0823; H04L 9/0825; H04L 9/3213; H04L 9/3247;
(Continued)

(56) References Cited

U.S. PATENT DOCUMENTS

| 5,812,666 | A | * | 9/1998 | Baker | .............. | G07B 17/00733 |
| | | | | | | 380/277 |
| 8,719,952 | B1 | * | 5/2014 | Damm-Goossens | ........................ | |
| | | | | | | H04L 9/0897 |
| | | | | | | 726/28 |

(Continued)

FOREIGN PATENT DOCUMENTS

CN 101534196 A 9/2009
CN 105243313 A 1/2016
(Continued)

OTHER PUBLICATIONS

"JSON Web Signature (JWS) ",[online] M. Jones, J. Bradley, N. Sakimura, May 2015, https://tools.ietf.org/html/rfc7515, PDF retrieved Aug. 26, 2019.
(Continued)

*Primary Examiner* — Sher A Khan
(74) *Attorney, Agent, or Firm* — Venable LLP

(57) ABSTRACT

According to the present invention, an information processing apparatus that verifies a signed token is provided. The apparatus comprises a holding unit for holding key information for verifying the signed token, an obtainment unit for obtaining new key information from a server that provides the key information, and holding the new key information in the holding unit, if the key information for verifying a received signed token is not held in the holding unit, and a verification unit for verifying the signed token using the key information if the key information for verifying the received signed token is held in the holding unit.

5 Claims, 9 Drawing Sheets

(52) U.S. Cl.
CPC ........ H04L 9/3247 (2013.01); H04L 63/0823 (2013.01); H04L 63/0884 (2013.01)

(58) Field of Classification Search
CPC ... H04L 63/0884; H04L 63/123; H04L 63/20; H04L 67/02
See application file for complete search history.

(56) References Cited

U.S. PATENT DOCUMENTS

| | | | | |
|---|---|---|---|---|
| 8,751,815 | B2* | 6/2014 | Lunde | H04L 9/3213 713/185 |
| 8,862,879 | B2* | 10/2014 | Lerner | H04L 9/3218 713/168 |
| 2004/0109568 | A1* | 6/2004 | Slick | G06F 21/608 380/277 |
| 2004/0205243 | A1* | 10/2004 | Hurvig | H04L 29/12132 709/245 |
| 2008/0104684 | A1* | 5/2008 | Lunde | H04L 63/126 726/6 |
| 2009/0254750 | A1* | 10/2009 | Bono | H04L 9/0822 713/170 |
| 2013/0283362 | A1* | 10/2013 | Kress | G06F 21/44 726/7 |
| 2017/0048700 | A1* | 2/2017 | Huang | H04L 63/062 |
| 2017/0213045 | A1* | 7/2017 | Garcia | H04L 63/04 |
| 2018/0152454 | A1* | 5/2018 | Kwon | H04L 63/10 |
| 2020/0145212 | A1* | 5/2020 | Tsuchida | H04L 9/3213 |

FOREIGN PATENT DOCUMENTS

| | | |
|---|---|---|
| CN | 107659406 A | 2/2018 |
| CN | 108432180 A | 8/2018 |
| JP | 2007-149010 A | 6/2007 |
| WO | WO-2018220693 A1 * 12/2018 | ............. G06F 21/45 |

OTHER PUBLICATIONS

"JSON Web Token (JWT)", [online] M. Jones, J. Bradley, N. Sakimura, May 2015, https://tools.ietf.org/html/rfc7519, PDF retrieved Aug. 26, 2019.

Chinese Office Action dated Jul. 28, 2021 in counterpart Chinese Patent Appln. No. 201910789691.0.

* cited by examiner

INFORMATION PROCESSING APPARATUS, AUTHORIZATION SYSTEM, AND VERIFICATION METHOD

BACKGROUND OF THE INVENTION

Field of the Invention

The present invention relates to an information processing apparatus, authorization system, and verification method for verifying an authorization token or the like that uses a signed token, for example.

Description of the Related Art

Recently, web-based services provided over networks authenticate users to determine whether or not they are authorized to use those services. Web-based services themselves are becoming more diverse, and as multiple web-based services are being used in conjunction with each other, resource servers that provide the web-based service and authentication/authorization servers that authenticate/authorize are being configured as separate servers. With such a configuration, the authentication/authorization server and the resource server are linked through the exchange of authentication/authorization information. The authentication/authorization server issues an access token that includes authorization information, and a client uses the access token to receive the service provided by the resource server. OAuth 2.0 is an example of a specification for exchanging authorization information in this manner.

When implementing the conventional OAuth specification, basically, the resource server basically makes a verification query to the authentication/authorization server (a server that holds the states of tokens) for all access tokens the resource server receives from clients. For user information association with tokens, too, the resource server generally will make a query for information to an authorization server that holds the user information associated with the token. Thus as the number of clients and resource servers increases, the number of token verifications and information queries made from the resource server to the authentication/authorization server (the server holding the token information of already-issued tokens and the user information associated with the tokens) increases as well, which increases the load on the authentication/authorization server. Additionally, verification and information queries are made to the authentication/authorization server for all tokens received from the clients, which causes a drop in the performance of the resource server.

Incidentally, it is conceivable to add authorization information (a token ID, scope, validity period, and so on) and information associated with the token (a user ID, client ID, username, email address, and so on) to each token issued by the authentication/authorization server in order to enable the resource server itself to verify access tokens received from clients. The verification in the resource server can be realized by the authentication/authorization server adding a signature to the token and the resource server verifying that signature. Using JWS (JSON Web Signature) is one possible method for expressing a signed token. JWS is a means for expressing JWT (JSON Web Token) content protected by a digital signature, MACs (Message Authentication Codes), or the like. JWT is also a method for expressing URL-safe claims using a data structure based on JSON (JavaScript Object Notation (Java is a registered trademark)).

A method such as that disclosed in Japanese Patent Laid-Open No. 2007-149010 can be given as an example of a rights management system capable of reliably verifying tokens, even at the point in time when the system that has accepted the transfer of a token uses that token.

The authentication/authorization server can hold multiple pairs of private keys and public keys. The authentication/authorization server can also increase security by registering and using new keys if private keys have been leaked, the encryption algorithm being used has been compromised, or the like. Furthermore, the security of individual services can be increased by using different private keys for each service or client to be authorized. However, the authentication/authorization server and the resource server are constituted by separate servers, and thus even if a new key pair is registered in the authentication/authorization server, the resource server is not aware of this and cannot obtain the public key. It is therefore possible, in a system that verifies a signed token using a resource server, that an access token is issued with a signature using a private key corresponding to a public key not held by the resource server. In this case, the resource server will be unable to verify the token, and even if the client uses an access token issued by the authentication/authorization server, the resource server will determine that the signature is incorrect.

SUMMARY OF THE INVENTION

The present invention makes it possible, when a key is added to an authentication/authorization server, for a resource server to verify a signed token signed using the added key, even if the resource server is not notified that the key has been added.

The present invention has the following configuration. That is, according to a first aspect of the present invention, an information processing apparatus that verifies a signed token is provided, the apparatus comprising: a holding unit configure to hold key information for verifying the signed token; obtainment unit for obtaining new key information from a server that provides the key information, and holding the new key information in the holding unit, if the key information for verifying a received signed token is not held in the holding unit; and a verification unit configure to verify the signed token using the key information if the key information for verifying the received signed token is held in the holding unit.

According to the second aspect of the present invention, an authorization system is provided, the system comprising: a server that provides the key information and the signed token; a client that sends a request for a resource along with the signed token provided from the server; and an information processing apparatus that verifies a signed token, the apparatus including: a holding unit configured to hold key information for verifying the signed token; an obtainment unit configured to obtain new key information from the server that provides the key information, and holding the new key information in the holding unit, if the key information for verifying a received signed token is not held in the holding unit; and a verification unit configured to verify the signed token using the key information if the key information for verifying the received signed token is held in the holding unit.

According to the third aspect of the present invention, a signed token verification method carried out by an information processing apparatus is provided, the method comprising: holding key information for verifying the signed token in a holding unit; obtaining new key information from a server that provides the key information, and holding the new key information in the holding unit, if the key information for verifying a received signed token is not held in the holding unit; and verifying the signed token using the key information if the key information for verifying the received signed token is held in the holding unit.

According to the present invention, when a key is added to an authorization server, a resource server can verify a signed token signed using the added key, even if the resource server is not notified that the key has been added.

Further features of the present invention will become apparent from the following description of exemplary embodiments with reference to the attached drawings.

DESCRIPTION OF THE EMBODIMENTS

Embodiments of the present invention will be described hereinafter with reference to the drawings. First, configurations shared by multiple embodiments will be described.

System Configuration

Figure 1:
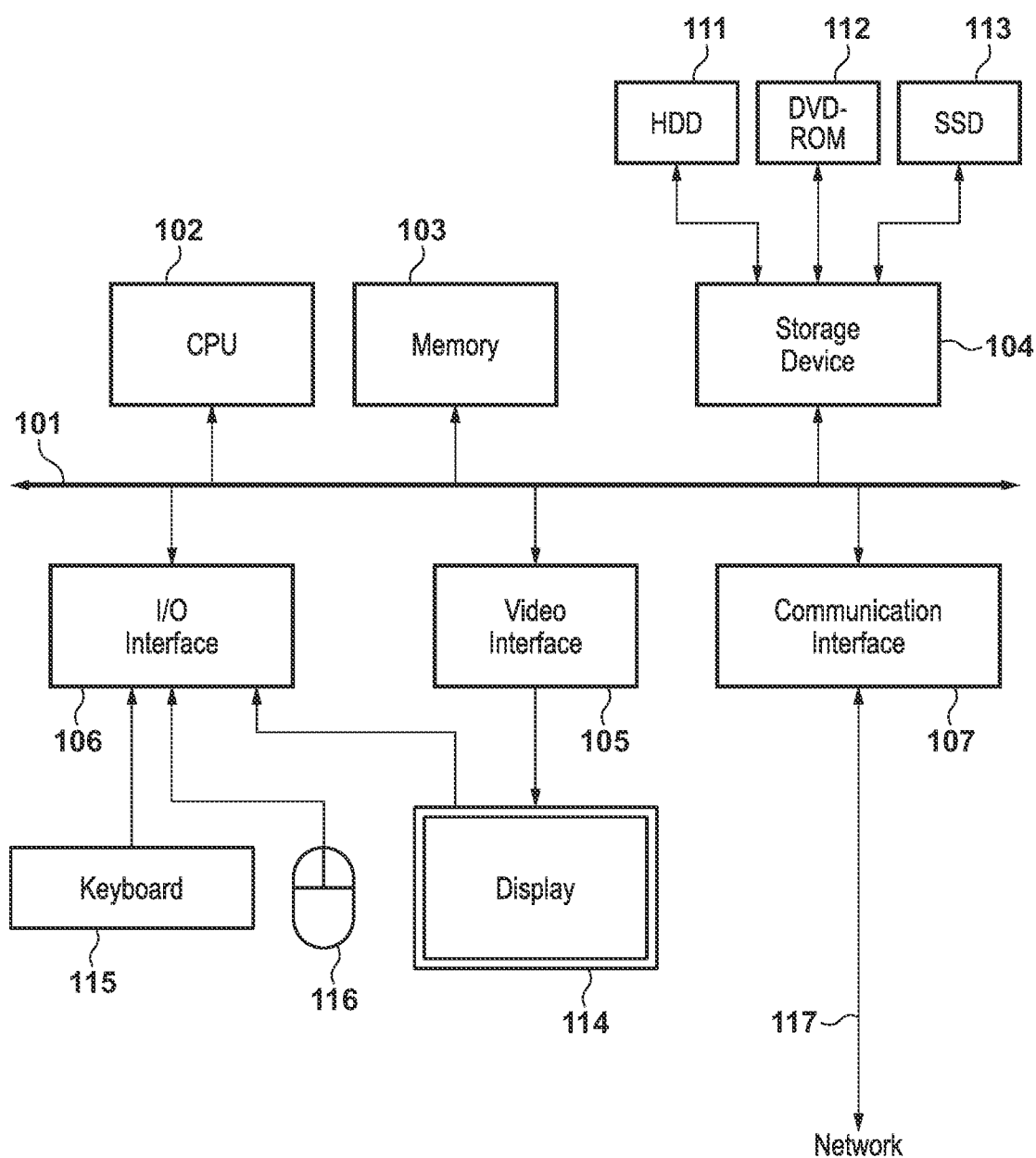
FIG. 1 is a diagram illustrating the configuration of a computer according to embodiments of the present invention.

FIG. 1 is a diagram illustrating the system configuration of an information processing apparatus according to embodiments of the present invention. The information processing apparatus is a computer that functions as a server, a client, or the like. As illustrated in FIG. 1, the information processing apparatus includes a CPU 102, memory 103, a storage device 104, a video interface 105, an input/output (abbreviated as "I/O" hereinafter) interface 106, and a communication interface 107. The constituent elements in the information processing apparatus are connected to each other by a system bus 101. The CPU 102 is a central processing unit that controls the constituent elements over the system bus 101, calculates and processes data, and so on. The memory 103 is a device that stores data, programs, and the like, and is constituted by RAM (Random Access Memory), ROM (Read-Only Memory), or the like. The storage device 104 writes and reads out stored data. The storage device 104 includes a hard disk drive (HDD) 111, a DVD-ROM drive 112 used as a non-volatile data source, and a solid-state drive (SSD) 113 that uses semiconductor memory. Although not illustrated in FIG. 1, a magnetic tape drive, a Floppy (registered trademark) disk drive (FDD), a CD-ROM drive, a CD/DVD-RAM drive, a USB flash drive, or the like can also be used as the storage device 104.

Programs according to the embodiment are read from the storage device 104, stored in the memory 103, and executed by the CPU 102. Although the configuration is such that the programs are read from the storage device 104 according to the embodiments, the configuration may be such that the programs are read from ROM (not shown), from the exterior via the communication interface 107, or the like.

The video interface 105 controls the output of displays to a display device 114. The display device 114 may be a CRT type, a liquid crystal type, or the like. Input devices such as a keyboard 115, a pointing device 116, and the like are connected to the I/O interface 106. An operator makes commands for operations and the like to the information processing apparatus by manipulating the keyboard 115. The pointing device 116 moves a cursor in the display device 114 to select and operate menu items, objects, and the like. Operational inputs using a touch panel or the like can also be made through the display device 114. In this case, the display device 114 functions as both an output device and an input device.

The communication interface 107 communicates with external devices over a computer network 117. The network connected to is a LAN, a WAN, a public line such as the internet, or the like.

Note that servers need not include user interface devices, such as the display device 114, the keyboard 115, a mouse 11, and the like, as well as the interfaces for those devices.

Figure 2:
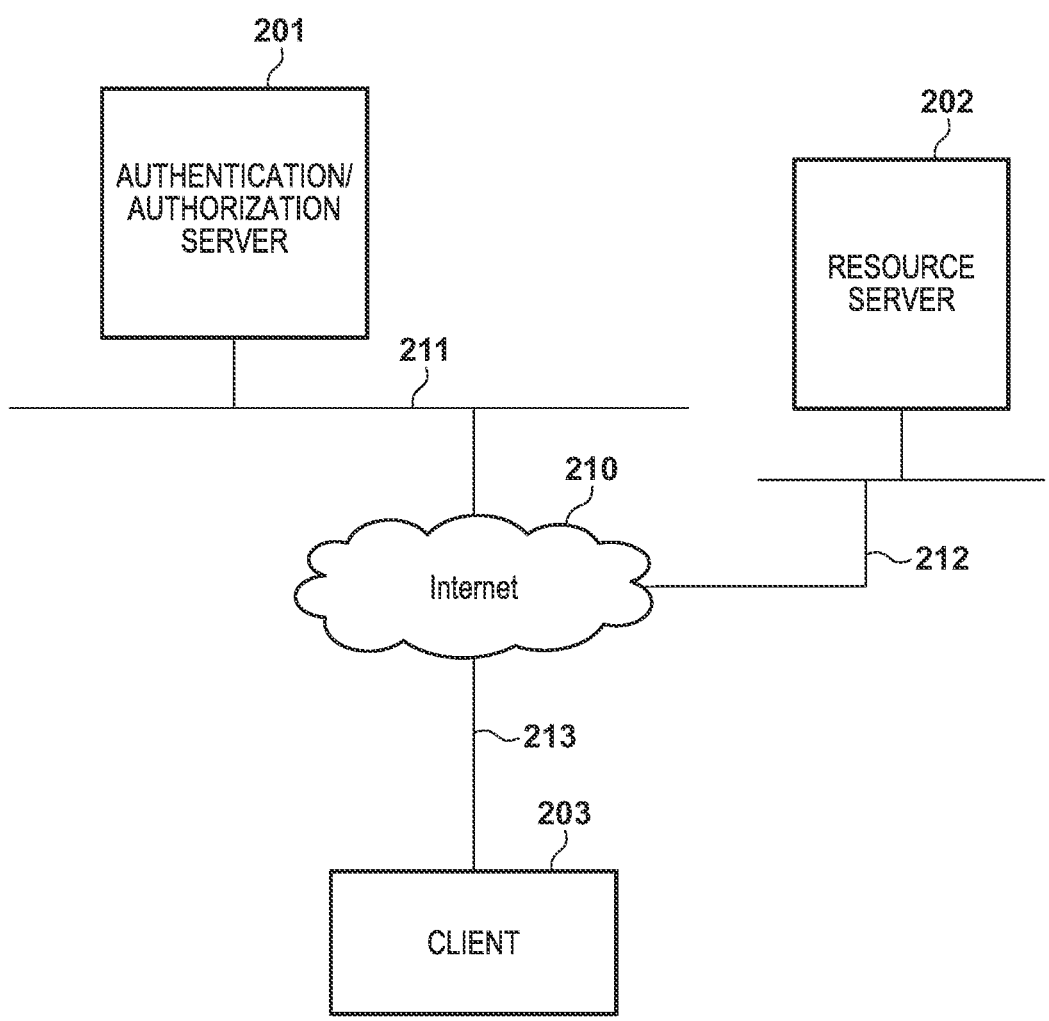
FIG. 2 is a diagram illustrating the configuration of a network according to embodiments of the present invention.

FIG. 2 is a diagram illustrating the network configuration according to embodiments of the present invention. Computer networks 211, 212, and 213 are connected to the internet 210, and an authentication/authorization server 201 is connected to the computer network 211. A resource server 202 is connected to the computer network 212, and a client 203 is connected to the computer network 213. In these embodiments, the resource server 202 is connected to a computer network over the internet 210, but may instead be located on the same LAN as the authentication/authorization server 201. The client 203 is not limited to being connected to the computer network 213 as illustrated in FIG. 2, and may be connected to the computer network 211 or 212.

The client 203 obtains an access token from the authentication/authorization server 201. The client 203 then accepts the provision of a web-based service (called simply a "service" hereinafter) from the resource server 202 using the obtained access token. In these embodiments, the authentication/authorization server 201, the resource server 202, and the client 203 all have the configuration of the information processing apparatus illustrated in FIG. 1. However, the configuration is not limited to that illustrated in FIG. 1, and the display device 114 may be omitted, other functions may be added, and so on. The server is also not limited to a single computer, and may instead be a system constituted by multiple rack-mounted computers.

Issuance and Verification of Signed Access Token (Conventional)

Figure 3:
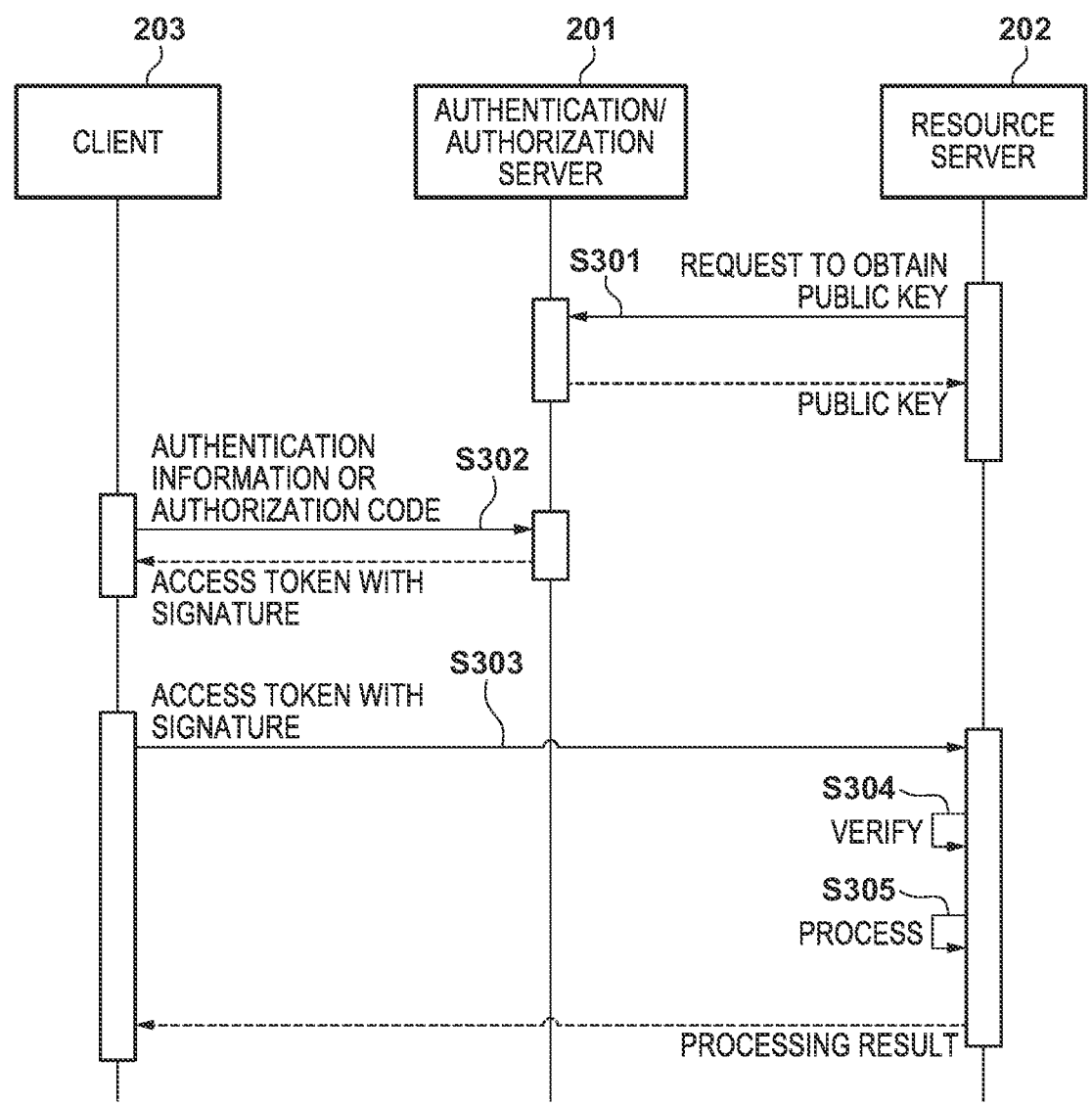
FIG. 3 is a sequence chart illustrating access token issuance and verification.

FIG. 3 illustrates the flow of access token issuance and verification according to a conventional technique. FIG. 3 is a sequence chart pertaining to the issuance and verification of a signed token, e.g., a signed access token, according to the conventional technique. The flow is carried out between the authentication/authorization server 201, the client 203, and the resource server 202 illustrated in FIG. 2. Here, "signature" refers to a digital signature or an electronic signature. For example, when data to be verified is given a digital signature for encrypting that data with a private key and is sent, the recipient of the data decrypts the signature with a public key and compares the decryption result with the data in question. If the data matches, the verification is determined to be a success. Although this is merely one example, signed data is generally verified according to a procedure such as this. In the embodiments, a "key" is digital information, and may also be referred to as "key information". Furthermore, in the following embodiments, "authentication" is a procedure through which the authority of a subject (e.g., a user) is confirmed using an ID, secret information, or the like, for example. "Authorization" is a procedure for confirming the transfer of the authority held by an authenticated subject to another party (e.g., a client or the like). These are merely examples, and the definitions are not limited thereto. A server that provides a service pertaining to this authentication and authorization is called an "authentication/authorization server", and may, in the following descriptions, be called simply an "authentication server" or an "authorization server" depending on the service being provided.

First, in step S301, the resource server 202 makes a request to the authentication/authorization server 201 for the public key, and obtains the public key. Next, in step S302, the client 203 passes authentication information or an authorization code to the authentication/authorization server 201 to request and obtain a signed access token. Then, in step S303, the client 203 uses the obtained signed access token to request the resource server 202 to provide a service. In step S304, the resource server 202 verifies whether or not the access token is valid on the basis of the received signature. At this time, by verifying the signature using the public key obtained from the authentication/authorization server 201, the resource server 202 can confirm that the access token has been issued by a valid authentication/authorization server. Then, in step S305, if the access token is valid, the resource server 202 executes processing for providing the service, and passes the processing result to the client 203. Note that if the access token is invalid in the verification in step S304, the resource server 202 does not carry out the processing, and instead returns an error to the client 203.

Here, the public key obtainment request of step S301 in FIG. 3 may be carried out once before the services provided to the client 203, such as when the resource server 202 is reset or the like. However, there are cases where a new private key-public key pair is added to the authentication/authorization server 201 after the public key has been obtained in step S301. In this case, it is possible that an access token which has been signed using a key held by the authorization/authentication server 201 but not held by the resource server 202 is issued to the client 203. The result is that the access token will be determined to be invalid when the signature is verified in the resource server 202, despite the access token actually being valid. To prevent this, it is necessary, when the resource server 202 verifies the signature, for the resource server 202 to be holding the public key that forms a pair with the private key used by the authentication/authorization server 201 to sign the access token.

Here, it is conceivable for the authentication/authorization server 201 to notify the resource server 202 that a key has been added each time a new private key-public key pair is added to the authentication/authorization server 201. However, doing so requires the construction of a system for sending and receiving notifications, and both the authentication/authorization server 201 and the resource server 202 must be compliant with the notification system, which complicates the system as a whole. Even if the notification is made, the same problem arises until the resource server obtains the public key, and there is no method through which the authentication/authorization server 201 can confirm that all of the linked resource servers have obtained the public key. The method for handling this problem, described below, does not require a notification from the authentication/authorization server 201, and makes it possible to correctly verify a signature added using a private key forming a pair with the public key not held by the resource server 202. Furthermore, even if the configuration is such that the resource server 202 periodically checks with the authentication/authorization server 201 as to whether the keys have been updated, using the method described hereinafter makes it possible to set a longer interval for the update check than if the method is not used. Note that the method described below is a method for handling a situation where a new key has been added to the resource server 202, and thus the configuration may be such that the resource server 202 is notified only when a key which had been held in the resource server 202 has been deleted. A method for handling the above-described problem, according to a first embodiment, will be described next.

First Embodiment

JWS Access Token

A JWS holding access token information (called a "JWS access token" hereinafter), which is used in the present embodiment, will be described in detail next.

The JWS access token is constituted by a JWS header, a JWS payload, and a JWS signature. The constituent elements of the JWS access token used in the present embodiment will be described next.

TABLE 1

Table 1: claims included in JWS access token

| | VALUE | CLAIM NAME | CLAIM DETAILS |
|---|---|---|---|
| 1 | JWS Header | "alg"(Algorithm) | identifies encryption algorithm used for JWS signature |
| 2 | | "typ"(Type) | contains "JWT" to indicate the JWT format |
| 3 | | "kid"(Key ID) | indicates which key was used to protect the JWS |
| 4 | Payload | "iss"(Issuer) | identifier of the JWT issuer |
| 5 | | "sub"(Subject) | identifier of the JWT subject |
| 6 | | "aud"(Audience) | list of identifiers of subjects expected to use the JWT |
| 7 | | "exp"(Expiration Time) | validity period of JWT |
| 8 | | "nbf"(Not Before) | date/time when JWT becomes valid |
| 9 | | "iat"(Issued At) | time when JWT was issued |

The claims with the value "JWS Header" in Table 1 are "Registered Claims" as defined in JWS RFC7515, and are as follows. Note that a "claim" is information claimed by the subject, and is expressed as a name/value pair constituted by a claim name and a claim value. In other words, the claims in the "JWS Header" include "alg" (Algorithm), which identifies the encryption algorithm used in the JWS signature; "typ" (Type), in which "JWT" is written to indicate the JWT format; and "kid" (Key ID), which indicates which key was used to protect the JWS.

Furthermore, the claims in Table 1 are "Registered Claims" defined in JWT RFC7519, and are as follows. "iss" (Issuer) is an identifier of the issuer of the JWT; "sub" (Subject) is an identifier of the subject of the JWT; "aud" (Audience) is an identifier list of the subjects who are anticipated to use the JWT; "exp" (Expiration Time) is the expiration period of the JWT; "nbf" (Not Before) is a date/time when the JWT becomes valid; and "iat" (Issued At) is a unique identifier for the JWT. The date/times designated in the aforementioned "exp", "nbt", and "iat" are JSON numerical values expressing UTC dates and times, up to seconds, designated from 1970-01-01T0:0:0Z UTC. Although the "Registered Claims" may be used as desired, the JWS header "kid" and the JWS payload "iat" are set as required items in the authorization server according to the present embodiment.

According to the present embodiment, in an authorization server that issues a JWS access token having content such as that indicated in Table 1, the claims in Table 1 are encoded according to RFC7519, which is a JWT specification, as a JSON object. Content digitally signed according to the compact serialization specification in RFC7515, which is a JWS specification (a JSON expression of the claims in Table 1, i.e., the JWS payload), is expressed and encoded as a compact URL-safe character string. The JWS access token according to the present embodiment is a character string in which the encoded JWS header, the encoded JWS payload, and the encoded JWS signature are connected in that order using a period (.) as a delimiter, according to the JWS compact serialization specification. The following is an example of the result of linking the JWS header ("Header" part), the JWS payload ("Payload" part), and the encoded JWS header, the encoded JWS payload, and the encoded JWS signature ("Encoded" part).

authorization server 201 executing programs stored in memory. A client management unit 401 manages client information. A resource server information management unit 402 manages information pertaining to the resource server 202 linked with the authentication/authorization server 201. A private key/public key pair management unit 403 manages the keys used to sign JWS access tokens. The private key/public key pair management unit 403 passes the required public key to the resource server 202 in response to a request from the resource server 202. Table 2 is a private key/public key pair management table managed by the private key/public key pair management unit 403.

TABLE 2

Table 2: private key/public key pair management table

|   | Key ID | PRIVATE KEY | PUBLIC KEY |
|---|---|---|---|
| 1 | 3e4aed8ee5914d9e82ca0ae762fc84ef | xxx | xxx |
| 2 | f2bcf072e23142b0909163cadf0c2347 | yyy | yyy |
| 3 | 60730fd46abf4d51908057f7ef059050 | zzz | zzz |

The private key/public key pair management table in Table 2 is constituted by a Key ID item, which indicates a Key ID for uniquely identifying a private key/public key pair; a private key item, which indicates details of the private key; and a public key item, which indicates details of the public key. The values set in the private key item and the public key item may be actual files or file paths.

A JWS access token issuing unit 404 issues JWS access tokens, and information of the issued JWS access tokens is managed by an issued JWS access token management unit 405. A JWS access token verification unit 406 verifies whether or not a JWS access token is valid. Note that the JWS access token verification is carried out in the resource server, by a JWS access token verification unit 504, which will be described later with reference to FIG. 5.

```
Header
{
    "alg": "RS256",
    "typ": "JWT",
    "kid": "3e4aed8ee5914d9e82ca0ac762fc84ef"
}
Payload
{
    "iss": "https://auth.example.com",
    "sub": "1ce42f74-1225-4cbb-b23f-f525dabc3cfd",
    "aud": "[https://print.srv.example.com https://form.srv.example.com]",
    "exp": 1472713413,
    "nbf": 1472709813,
    "iat": 1472709813
}
Encoded
    eyJhbGciOiJSUzI1NiIsInR5cCI6IkpXVCJ9...(base64 encoded
header).eyJpc3MiOiJjbGllbnQwMDEiLCJzdWIiOiJodHRwczovL3h4eC5jb20vIi
wiYXVkIjoiaHR0cHM6Ly94eHguY29tL2F1dGhyaXphdGlvbiIsImV4cCI6MTQ
3MjcxMDQxMywiaWF0IjoxNDcyNzAwNDEzfQ...(base64 encoded
payload).k_SbabNV...(Signature)
```

Function Blocks of Authentication/Authorization Server

Figure 4:
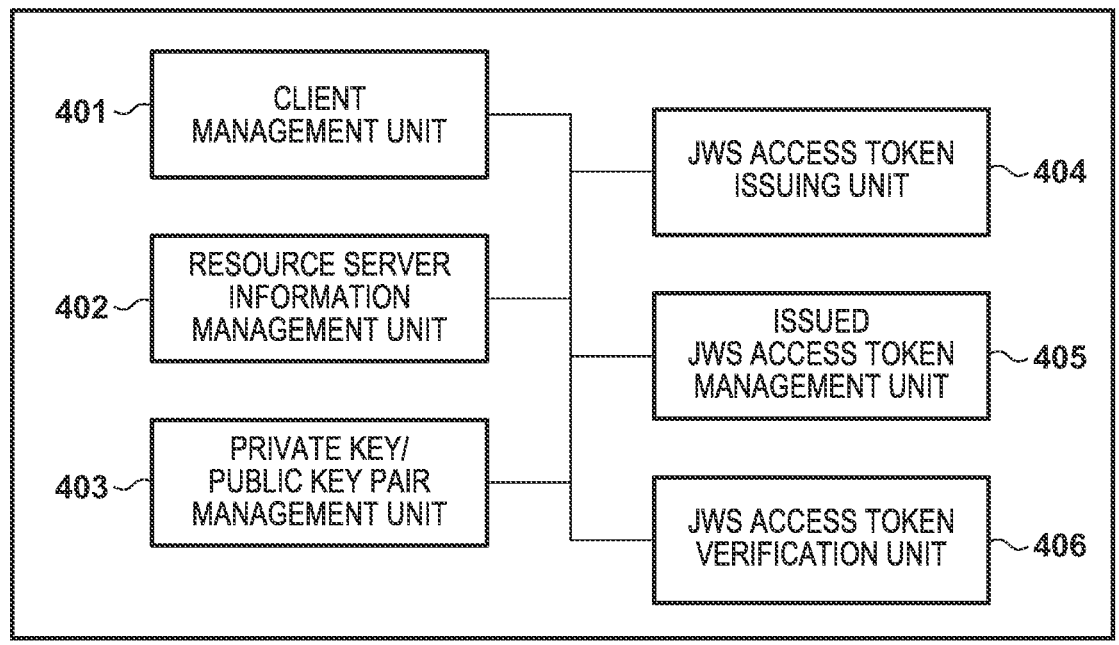
FIG. 4 is a function block diagram illustrating an authentication/authorization server according to embodiments of the present invention.

FIG. 4 is a function block diagram illustrating the authentication/authorization system according to an embodiment of the present invention. These function blocks operate in the authentication/authorization server 201. Each block is realized by, for example, the CPU of the authentication/

Function Blocks of Resource Server

Figure 5:
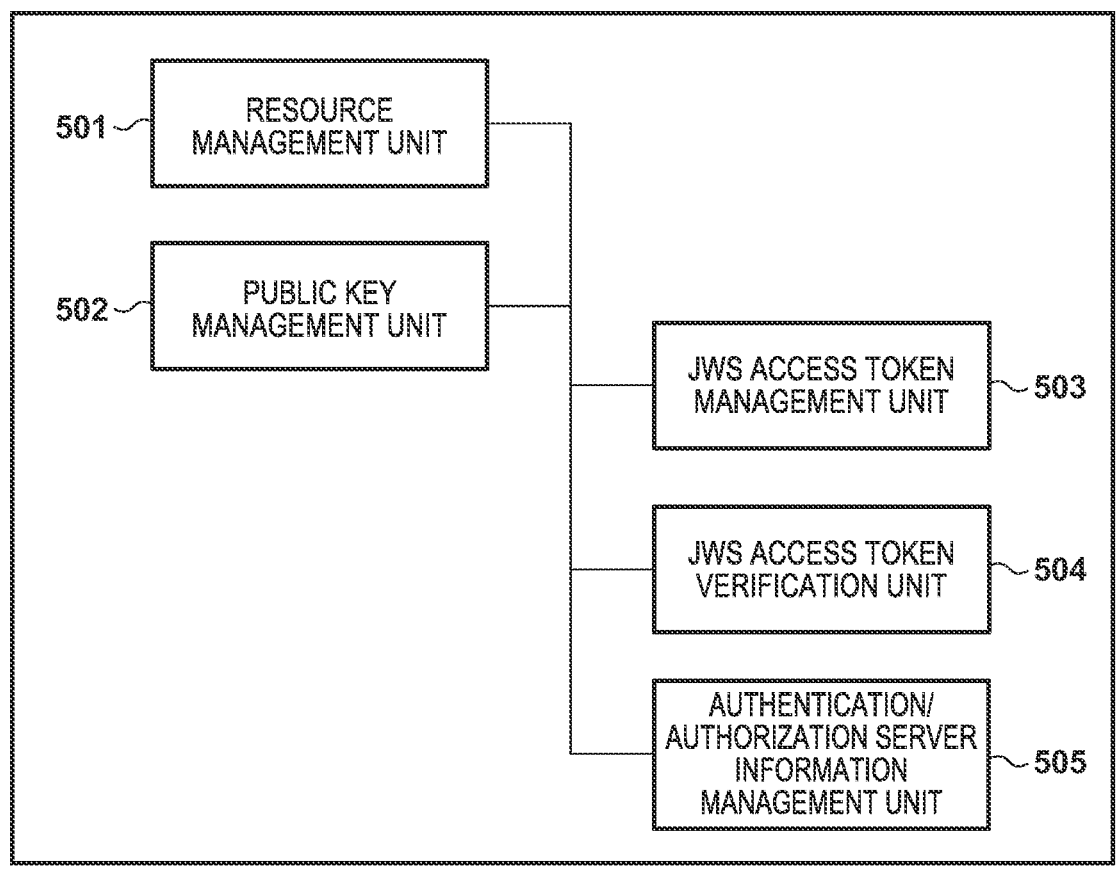
FIG. 5 is a function block diagram illustrating a resource server according to embodiments of the present invention.

FIG. 5 is a function block diagram illustrating the authentication/authorization system according to an embodiment of the present invention. These function blocks operate in the resource server 202. Each block is realized by, for example, the CPU of the resource server 202 executing programs stored in memory. A resource management unit 501 manages resource information, a JWS access token management unit 503 manages JWS access token information, and a JWS access token verification unit 504 verifies JWS access tokens. A public key management unit 502 manages public keys obtained from the authentication/authorization server 201. The public key management unit 502 also makes requests for obtaining public keys to the authentication/authorization server 201 and obtains the public keys as necessary. Table 3 is a public key management table managed by the public key management unit 502.

TABLE 3

Table 3: public key management table

| | Key ID | PUBLIC KEY |
|---|---|---|
| 1 | 3e4aed8ee5914d9e82ca0ae762fc84ef | xxx |
| 2 | f2bcf072e23142b0909163cadf0c2347 | yyy |
| 3 | 60730fd46abf4d51908057f7ef059050 | zzz |

The public key management table in Table 3 is a table for managing public keys obtained from the authentication/authorization server 201, and is constituted by a Key ID item, which indicates a Key ID for uniquely identifying the public key, and a public key item, which indicates details of the public key. The values set in the private key item and the public key item may be actual files or file paths. An authentication/authorization server information management unit 505 manages information pertaining to the authentication/authorization server 201 linked with the resource server 202.

Issuance and Verification of Signed Access Token (First to Fourth Embodiments)

Figure 6:
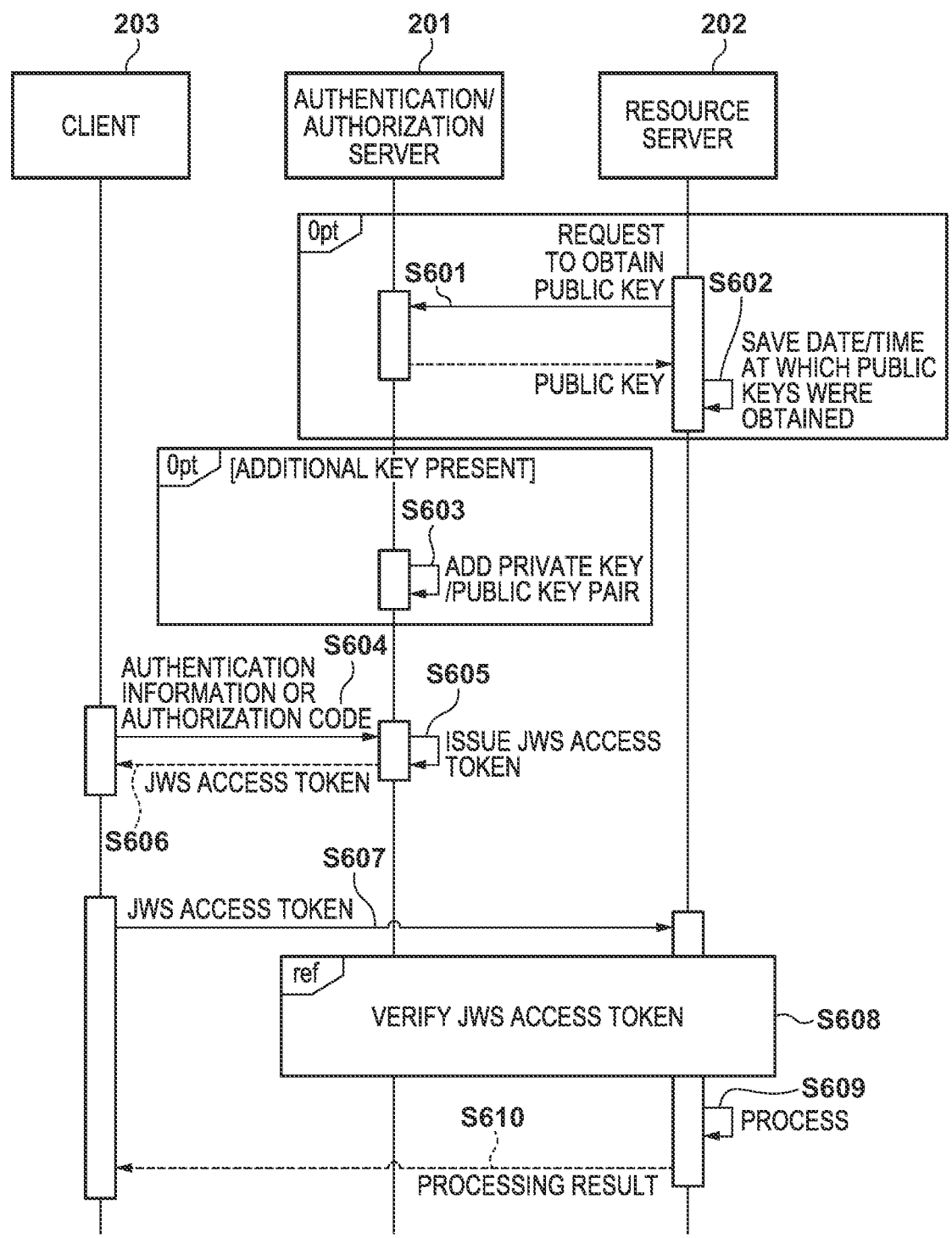
FIG. 6 is a sequence chart illustrating JWS access token issuance and verification according to embodiments of the present invention.

FIG. 6 is a sequence chart pertaining to the issuance and verification of a signed access token in the authentication/authorization system according to an embodiment of the present invention. The present embodiment will describe the issuance and verification of a JWS access token using the flow of authorization code grants according to OAuth2 (RFC6749). However, the issuance and verification of the JWS access token may use a client credential grant, a resource owner password credential grant, an implicit grant, or the like according to OAuth2 (RFC6749), rather than an authorization code grant.

In the OAuth2 protocol, a client is registered in the authentication/authorization server 201 before starting the flow of access token issuance and the like. The method for registering the client 203 in the authentication/authorization server 201 uses an HTML registration form following a dialog with a normal end user (not shown). The present embodiment assumes that the required clients are registered in advance.

FIG. 6 according to the present embodiment illustrates, in detail, the flow executed after the authentication/authorization server 201 verifies the resource owner and registers an authorization code, and the client 203 obtains the authorization code (not shown), according to the authorization code flow of OAuth2 (RFC6749).

In step S601, the resource server 202 issues a public key obtainment request to the authentication/authorization server 201, and obtains all the public keys held by the authentication/authorization server 201. In the present embodiment, this process is carried out once, during processing for resetting the resource server 202.

In step S602, the resource server 202 saves the date/time at which the public keys were obtained from the authentication/authorization server 201. The date/time of the obtainment is used in the JWS access token verification flow according to the second embodiment and the fourth embodiment as well, which will be described later. As such, the date/time of the obtainment does not absolutely have to be saved in the present embodiment, the third embodiment, and so on.

In step S603, the authentication/authorization server 201 adds a new private key/public key pair to the private key/public key pair management unit 403. This process is carried out when a new key pair has become necessary, such as when private keys have been leaked from the private key/public key pair management unit 403 of the authentication/authorization server 201, the encryption algorithm being used has been compromised, or the like.

In step S604, the client 203 requests the authentication/authorization server 201 to issue an access token, which indicates an authorization code and various types of credentials, in accordance with the OAuth protocol specifications.

In step S605, the authentication/authorization server 201 issues a JWS access token in response to the request.

In step S606, the JWS access token issuing unit 404 of the authentication/authorization server 201 returns the JWS access token issued in step S605 to the client 203.

In step S607 the client 203 uses the JWS access token obtained earlier to request the resource server 202 to provide a service. Specifically, the client 203 sets the JWS access token in an HTTP Authentication header and uses the JWS access token when calling a resource request REST API or the like.

In step S608, the resource server 202 verifies the JWS access token received from the client 203. The JWS access token verification according to the present embodiment will be described later using the flowchart in FIG. 7.

If the result of the verification in step S608 indicates that the JWS access token is valid, in step S609, the resource server 202 executes processing for providing the service. If the JWS access token is invalid, however, the process for providing the service is not executed.

If the processing of step S609 has been executed, in step S610, the resource server 202 returns the processing result to the client 203. If the verification failed in step S608, however, the resource server 202 returns an error to the client 203. The sequence pertaining to the issuance and verification of a signed access token in the authentication/authorization system illustrated in FIG. 6 then ends.

Access Token Verification Process by Resource Server (No. 1)

Figure 7:
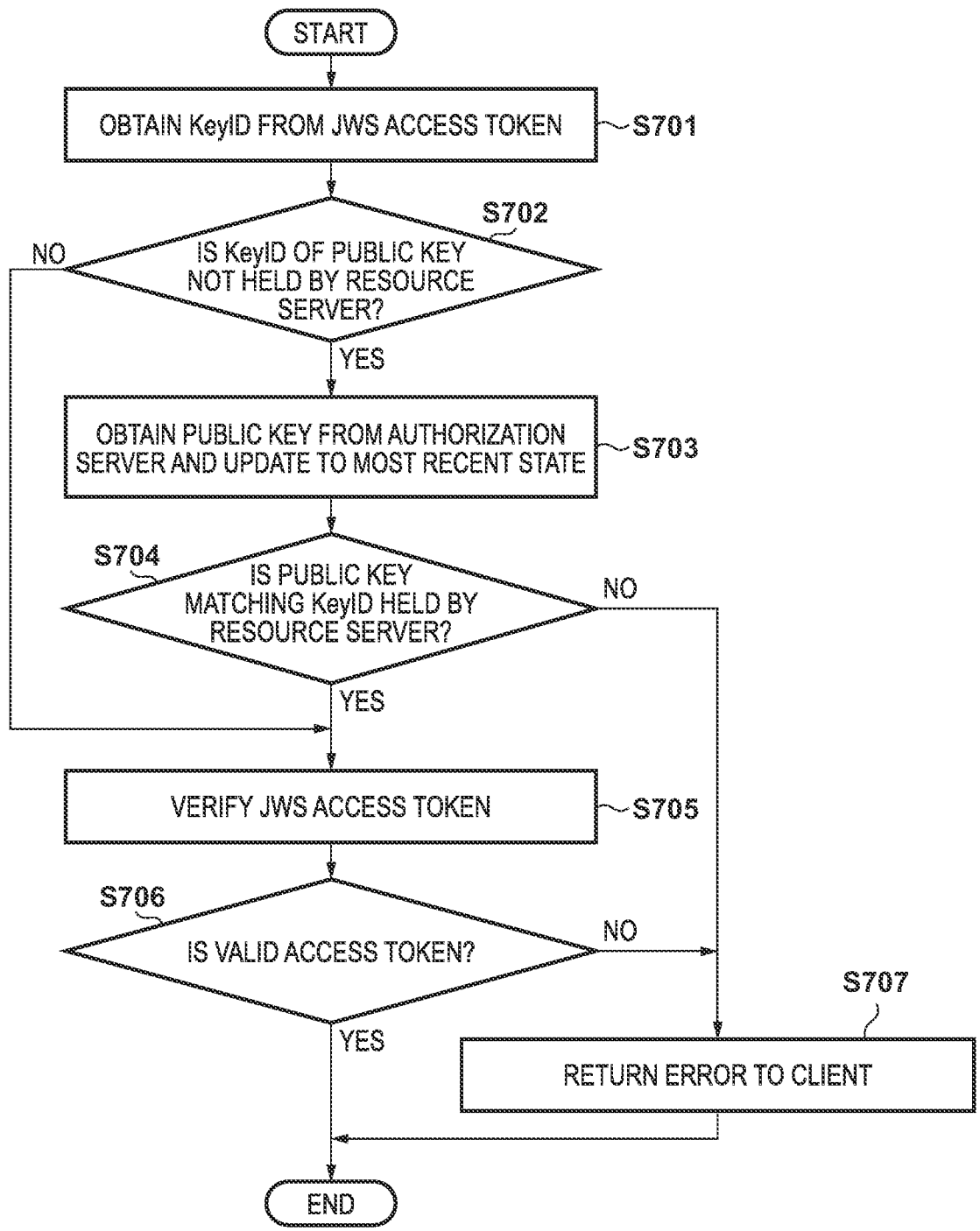
FIG. 7 is a flowchart illustrating JWS access token verification according to a first embodiment of the present invention.

FIG. 7 is a flowchart illustrating a JWS access token verification process carried out by the JWS access token verification unit 504 of the resource server 202 according to an embodiment of the present invention. FIG. 7 illustrates the processing by the resource server 202 in step S608 of FIG. 6.

In step S701, the JWS access token verification unit 504 of the resource server 202 obtains the JWS access token from the service request received from the client 203. The KeyID included in the header parameter of the obtained JWS access token is obtained and used in the verification.

In step S702, the JWS access token verification unit 504 queries the public key management unit 502 as to whether or not a key matching the KeyID obtained in step S701 is present. The process moves to step S703 if there is no key matching the obtained KeyID, and to step S705 if a matching key is present.

In step S703, the public key management unit 502 makes a request to the authentication/authorization server 201 for obtaining a public key not held by the resource server 202. The public key obtainment request includes information of the public keys currently held by the resource server 202, and only the difference from the keys held by the authentication/authorization server 201 may be obtained, or all the keys held by the authentication/authorization server 201 may be obtained and updated.

In step S704, the JWS access token verification unit 504 again queries the public key management unit 502 as to whether or not a key matching the KeyID obtained in step S701 is present. The process moves to step S705 if there is a key matching the obtained KeyID, and to step S707 if there is no matching key.

In step S705, the JWS access token verification unit 504 verifies whether or not the access token is valid on the basis of the signature in the obtained JWS access token. Here, an access token can be confirmed as having been issued by a valid authentication/authorization server by confirming the signature using the public key that matches the KeyID in step S704.

In step S706, it is determined whether the JWS access token is a valid access token. The flow ends if the access token is determined to be a valid access token, after which the processing returns to the sequence illustrated in FIG. 6, and the process of step S609 is executed. The process moves to step S707 if it is determined that the access token is invalid.

In step S707, the resource server 202 determines that the access token is invalid and returns an error to the client 203. The sequence pertaining to the issuance and verification of the signed access token in the authentication/authorization system illustrated in FIG. 6, and the access token verification flow illustrated in FIG. 7, then end. In other words, step S707 corresponds to step S610 in FIG. 6 when the verification has failed.

This ends the JWS access token verification, and the verification process by the resource server 202, carried out by the JWS access token management unit 503 and the JWS access token verification unit 504 of the resource server 202 that has received a resource request API call.

The JWS access token verification according to the present invention as described above provides the following effects. The information added to the signed token (the JWS access token) includes an ID uniquely indicating the key used for the signature (the KeyID). Using this to verify the signature in the resource server and query the authorization server for the public key, according to the means of the present invention, makes it possible for the resource server to verify the signature even for a JWS access token signed by a key not held in the resource server.

Second Embodiment

In the JWS access token verification flow illustrated in FIG. 7 and described above in first embodiment, a query is made to the authentication/authorization server 201 each time a JWS access token signed with a KeyID not held by the resource server 202 is received. The present second embodiment will describe reducing the number of queries made to the authentication/authorization server 201 on the basis of the time at which the resource server 202 has queried the authentication/authorization server 201.

Table 4 is a public key query time management table for managing the times at which the resource server 202 has queried the authentication/authorization server 201 for a public key in step S602.

TABLE 4

Table 4: public key query time management table

| | Date | Key IDs |
|---|---|---|
| 1 | 2018/6/15 9:07:34.325 | 60730fd46abf4d51908057f7ef059050, f2bcf072e23142b0909163cadf0c2347, 3e4aed8ee5914d9e82ca0ae762fc84ef |

The public key query time management table in Table 4 is constituted by a Date item, which indicates the time (date/time) at which the authentication/authorization server 201 was queried, and a Key IDs item, which indicates a list of public keys obtained at the time of the query. It is sufficient for the query time to be managed using information pertaining to the most recent query only, and thus old query information may be discarded when a new query has been made. Depending on the system configuration, it is also possible to manage only the query time.

In the first embodiment, the resource server 202 verifies the JWS access token received from the client 203 in step S608, using the sequence illustrated in FIG. 7. The present second embodiment will describe the JWS access token verification next, using the flowchart in FIG. 8.

Figure 8:
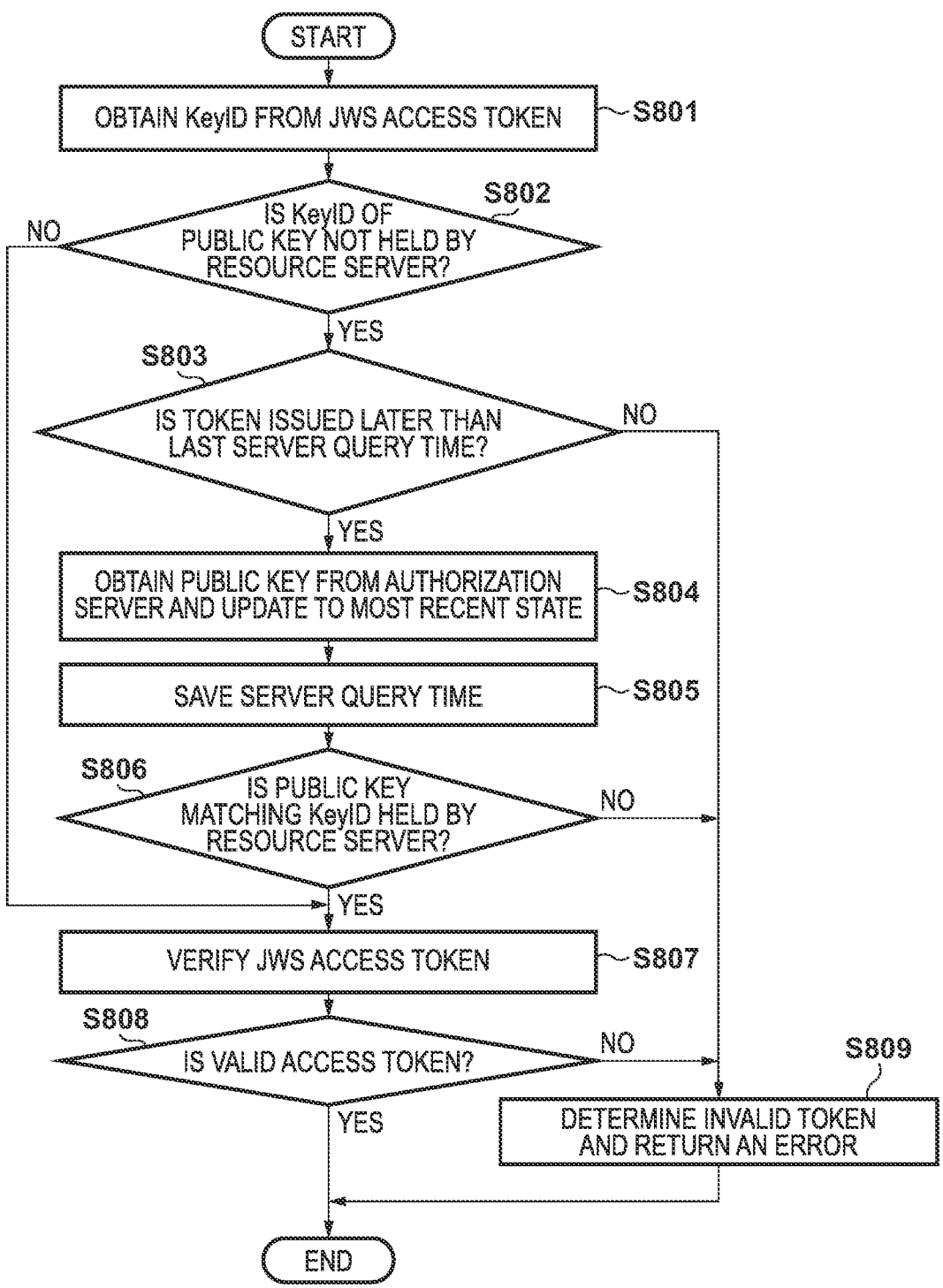
FIG. 8 is a flowchart illustrating JWS access token verification according to a second embodiment of the present invention.

FIG. 8 is a flowchart illustrating a JWS access token verification process carried out by the JWS access token verification unit 504 of the resource server 202 according to the second embodiment of the present invention.

In step S801, the JWS access token verification unit 504 of the resource server 202 obtains the JWS access token from the service request received from the client 203. The KeyID included in the header parameter of the obtained JWS access token is obtained and used in the verification.

In step S802, the JWS access token verification unit 504 queries the public key management unit 502 as to whether or not a key matching the KeyID obtained in step S801 is present. The process moves to step S803 if there is no key matching the obtained KeyID, and to step S807 if a matching key is present.

In step S803, the JWS access token verification unit 504 obtains the time at which the access token was issued from the received JWS access token, and compares that time with the query time managed by the public key query time management table in Table 4. The query time held in the public key query time management table has, as an initial value, the public key obtainment date/time held in step S602. The process moves to step S804 if the time at which the JWS access token was issued is later than the query time held in the public key query time management table, and to step S809 is the time is earlier. If the time at which the access token was issued is earlier than the last query time for a key made to the authentication/authorization server, it is possible to determine that a public key that can verify that access token cannot be obtained even if another query is made. In that case, the process moves to step S809, and an error is returned. If both times are the same, the time at which the access token was issued may be determined to be later, taking into account transmission delay. In other words, in such a case, even if both times are the same, the time at which the access token was issued may be determined to be after the last query time.

In step S804, the public key management unit 502 makes a request to the authentication/authorization server 201 for obtaining a public key not held by the resource server 202. The public key obtainment request includes information of the public keys currently held by the resource server 202, and only the difference from the key held by the authentication/authorization server 201 may be obtained, or all the keys held by the authentication/authorization server 201 may be obtained and updated.

In step S805, the resource server 202 holds the query time for the public key, made to the authentication/authorization server 201, in the public key query time management table in Table 4, in association with the ID of the key (KeyID). The query times held up to that point may be discarded, with only the newest query time remaining held. The newest query time held here is used in the comparison made in step S803.

In step S806, the JWS access token verification unit 504 again queries the public key management unit 502 as to whether or not a key matching the KeyID obtained in step S801 is present. The process moves to step S807 if there is a key matching the obtained KeyID, and to step S809 if there is no matching key.

In step S807, the JWS access token verification unit 504 verifies whether or not the access token is valid on the basis of the signature in the obtained JWS access token. An access token can be confirmed as having been issued by a valid authentication/authorization server by confirming the signature using the public key that matches the KeyID in step S806.

In step S808, it is determined whether the JWS access token is a valid access token. The flow ends if the access token is determined to be a valid access token, after which the processing returns to the sequence illustrated in FIG. 6, and the process of step S609 is executed. The process moves to step S809 if it is determined that the access token is invalid.

In step S809, the resource server 202 determines that the access token is invalid and returns an error to the client 203. The sequence pertaining to the issuance and verification of the signed access token in the authentication/authorization system illustrated in FIG. 6, and the access token verification flow illustrated in FIG. 8, then end. In other words, step S809 corresponds to step S610 in FIG. 6 when the verification has failed.

The JWS access token verification according to the present embodiment as described above provides the following effects. The information added to the signed token (the JWS access token) includes the time at which the JWS access token was issued by the authentication/authorization server. By comparing the time at which the resource server queried the authentication/authorization server to obtain the public key with the issuance time according to the means of the present invention, queries to the authentication/authorization server that are unlikely to result a key which can verify an access token can be suppressed. This makes it possible to reduce the number of queries to the authentication/authorization server from the resource server, and improve the performance of the servers, even when a JWS access token signed by a key not held in the resource server has been received from a client. Even if a malicious third party continuously sends invalid tokens to the resource server, unnecessary queries to the authorization server can be suppressed, which lightens the load on the servers.

In step S805, it is possible to store only the query time, without holding the KeyID. If the KeyID obtained through the query is already held in association with the query time, it is possible to avoid making a query for a set period of time following the previous query, even if a JWS access token signed with a key having the same KeyID has been received. This makes it possible to reduce the number of queries to the authentication/authorization server.

Third Embodiment

In the JWS access token verification flow illustrated in FIG. 7 and described above in first embodiment, a query is made to the authentication/authorization server 201 each time a JWS access token signed with a KeyID not held by the resource server 202 is received. The present third embodiment will describe reducing the number of queries made to the authorization server by adding a signature to part of the token when the authentication/authorization server generates a JWS access token, for example, adding a signature to the KeyID, which indicates the key used to sign the access token (the "kid" JWS header claim).

The first embodiment described the claims included in the JWS access token using Table 1. In the present third embodiment, the following new claim is added.

TABLE 5

Table 5: claim added to JWS access token

| VALUE | CLAIM NAME | CLAIM DETAILS |
| --- | --- | --- |
| 1 JWS Header | "kid_signature" | signature for character string that was "kid" (KeyID) |

The claim in Table 5 is JWS header private claim, set uniquely in the present embodiment. The JWS access token issuing unit 404 sets the Key ID of the key, which was used to sign the JWS access token when the JWS access token was issued in step S605, to the JWS header "kid" claim. At this time, the JWS access token issuing unit 404 generates a signature for the character string set to the "kid" claim, and sets a "kid_signature" claim. The key used to generate the signature for the "kid" claim is stored in the private key/public key pair management unit 403, and is held so as to be distinguishable from the key used to generate the signature added to the JWS access token. The public key of the key pair used for the "kid" claim signature is passed from the authentication/authorization server 201 along with the public key provided in response to the public key obtainment request from the resource server 202 in step S601.

In the present embodiment, the JWS private header is defined in order to include the signature for the KeyID in the JWS access token. However, the signature may be connected to the character string designating the KeyID using a period (.), and set to the "kid" claim.

In the first embodiment, in step S608, the resource server 202 verified the JWS access token received from the client 203 through the sequence illustrated in FIG. 7. The present third embodiment will describe the JWS access token verification next, using the flowchart in FIG. 9.

Figure 9:
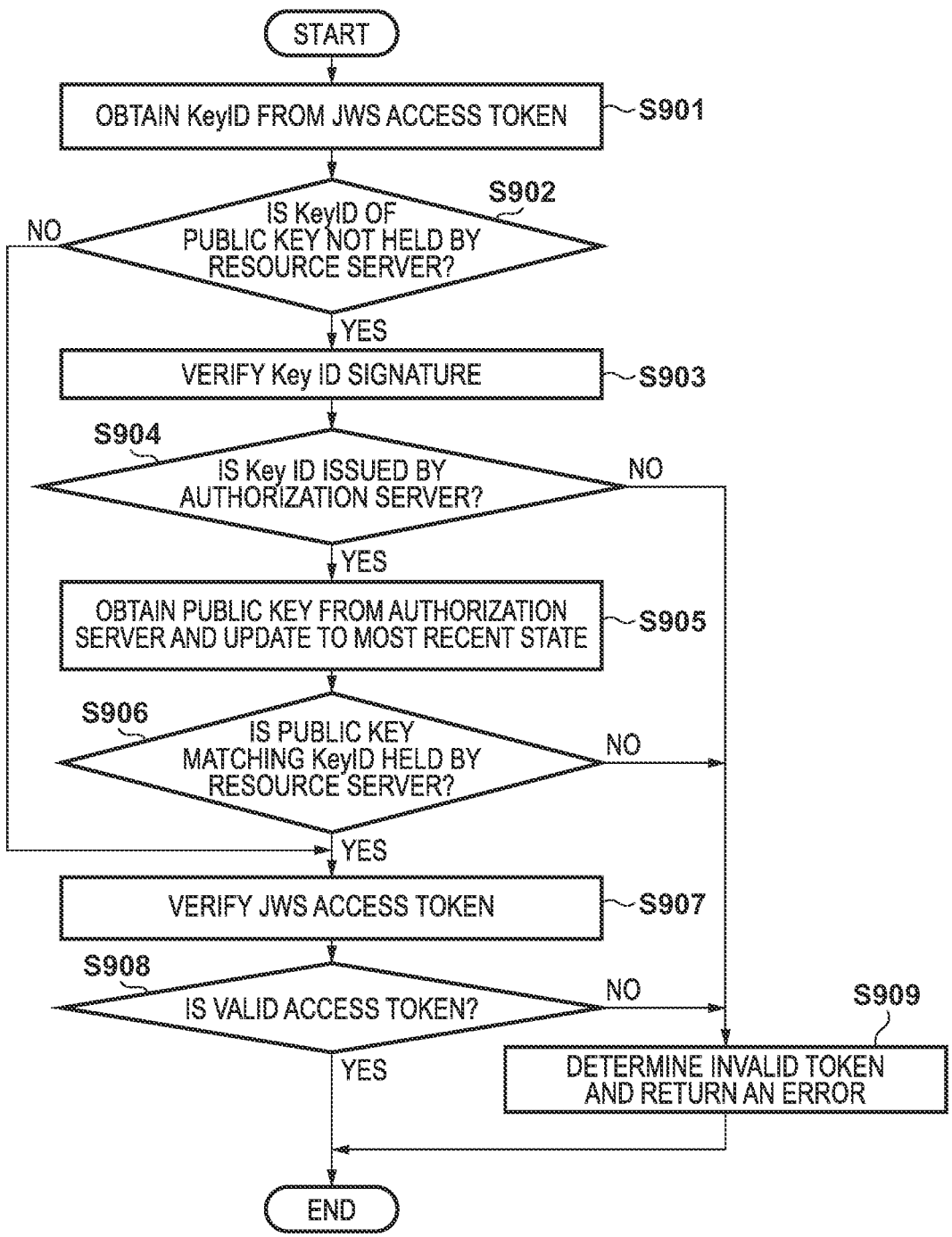
FIG. 9 is a flowchart illustrating JWS access token verification according to a third embodiment of the present invention.

FIG. 9 is a flowchart illustrating a JWS access token verification process carried out by the JWS access token verification unit 504 of the resource server 202 according to the third embodiment of the present invention.

In step S901, the JWS access token verification unit 504 of the resource server 202 obtains the JWS access token from the service request received from the client 203. The KeyID included in the header parameter of the obtained JWS access token is obtained and used in the verification.

In step S902, the JWS access token verification unit 504 queries the public key management unit 502 as to whether or not a key matching the KeyID obtained in step S801 is present. The process moves to step S903 if there is no key matching the obtained KeyID, and to step S907 if a matching key is present.

In step S903, the JWS access token verification unit 504 verifies the signature of the obtained KeyID, and verifies that the KeyID has been set by a valid authorization server. Specifically, the JWS access token verification unit 504 obtains the "kid_signature" claim included in the JWS header of the JWS access token, and verifies the signature using the public key for signing the KeyID, held by the public key management unit 502.

In step S904, the resource server 202 determines whether or not the signature verification carried out in step S903 indicates that the KeyID was issued by a valid authorization server. The process moves to step S905 if the KeyID is determined to have been issued by a valid authorization server, and to step S909 if the KeyID is determined to have been issued by an invalid authorization server.

In step S905, the public key management unit 502 makes a request to the authentication/authorization server 201 for obtaining a public key not held by the resource server 202. The public key obtainment request includes information of the public keys currently held by the resource server 202, and only the difference from the keys held by the authentication/authorization server 201 may be obtained, or all the keys held by the authentication/authorization server 201 may be obtained and updated to the most recent state.

In step S906, the JWS access token verification unit 504 again queries the public key management unit 502 as to whether or not a key matching the KeyID obtained in step S801 is present. The process moves to step S907 if there is a key matching the obtained KeyID, and to step S909 if there is no matching key.

In step S907, the JWS access token verification unit 504 verifies whether or not the access token is valid on the basis of the signature in the obtained JWS access token. An access token can be confirmed as having been issued by a valid authentication/authorization server by confirming the signature using the public key that matches the KeyID in step S906.

In step S908, it is determined whether the JWS access token is a valid access token. The flow ends if the access token is determined to be a valid access token, after which the processing returns to the sequence illustrated in FIG. 6, and the process of step S609 is executed. The process moves to step S909 if it is determined that the access token is invalid.

In step S909, the resource server 202 determines that the access token is invalid and returns an error to the client 203. The sequence pertaining to the issuance and verification of the signed access token in the authentication/authorization system illustrated in FIG. 6, and the access token verification flow illustrated in FIG. 9, then end. In other words, step S909 corresponds to step S610 in FIG. 6 when the verification has failed.

The JWS access token verification according to the present embodiment as described above provides the following effects. The information added to the signed token (JWS access token) includes a signature for "kid" (KeyID), which is a JWS header claim, in addition to the signature for the JWS access token. By verifying the signature for the KeyID when a JWS access token signed with a KeyID not held by the resource server according to the means of the present embodiment, the number of queries to the authentication/authorization server can be reduced. This makes it possible to reduce the number of queries to the authentication/authorization server from the resource server, and improve the performance of the servers, even when a JWS access token signed by a key not held in the resource server has been received from a client. Even if a malicious third party continuously sends invalid tokens to the resource server, unnecessary queries to the authorization server can be suppressed, which lightens the load on the servers.

Fourth Embodiment

The second embodiment and the third embodiment described flows for verifying the JWS access token, each based on the first embodiment, and these methods may be combined. The present fourth embodiment will describe reducing the number of queries to the authorization server by combining the flow of verification using the time at which the token was issued, as per the second embodiment, with the flow of verification using the signed KeyID, as per the third embodiment. Specific descriptions will be given next using the flowchart illustrated in FIG. 10.

Figure 10:
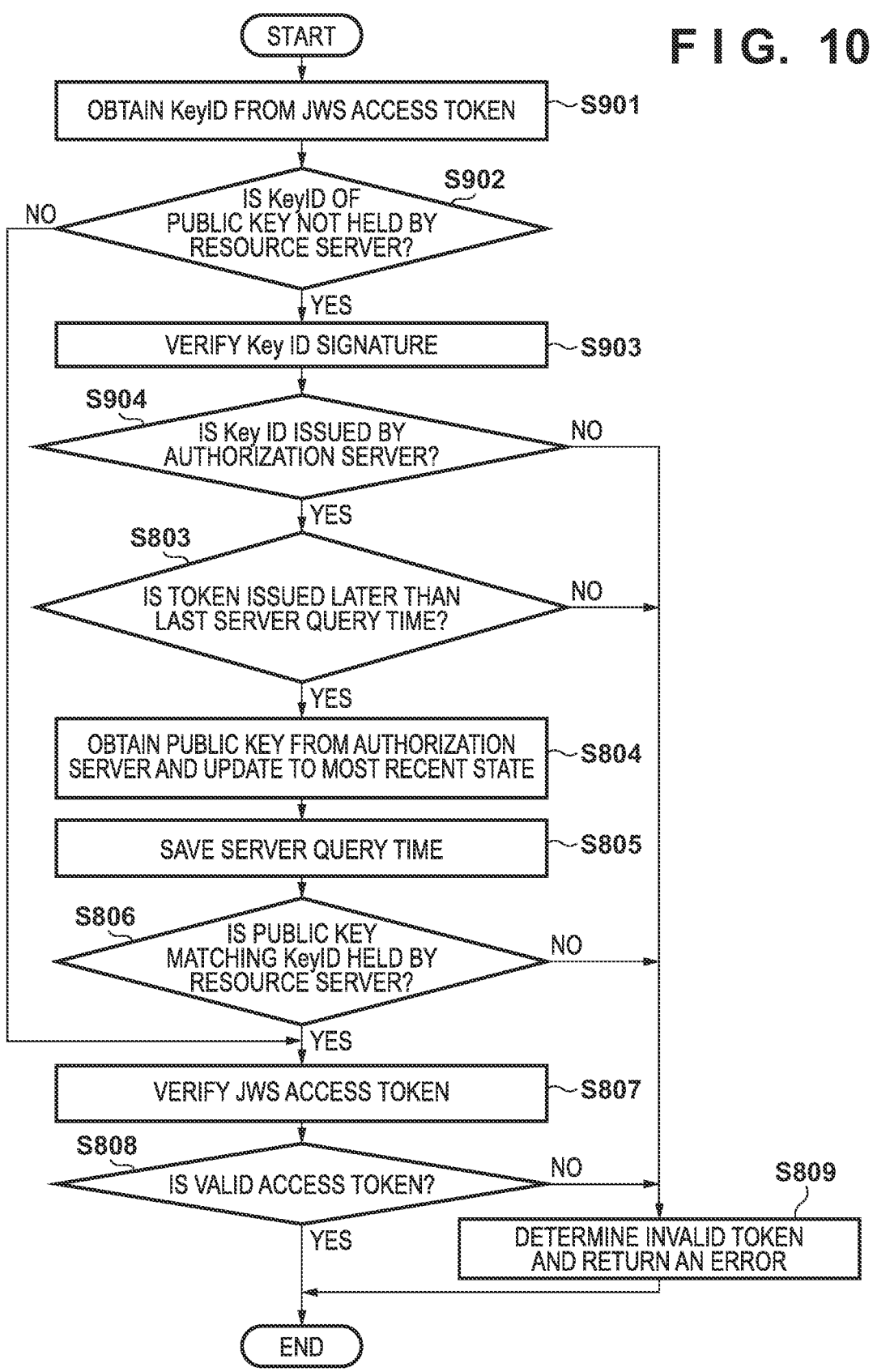
FIG. 10 is a flowchart illustrating JWS access token verification according to a fourth embodiment of the present invention.

FIG. 10 is a flowchart illustrating processing, carried out by the JWS access token verification unit 504 of the resource server 202, that combines the JWS access token verification processes according to the second embodiment and the third embodiment of the present invention. As such, the numbers appended to the steps of the earlier drawings will be used as-is. The flow of the verification in FIG. 10 first moves to step S901. The processing progresses from steps S901 to S904 in the same manner as the verification flow illustrated in FIG. 9. If the KeyID verification carried out in step S904 indicates that the KeyID was issued by a valid authorization server, the process moves to step S803 in the flow illustrated in FIG. 8. The flow from step S803 follows the verification flow illustrated in FIG. 8. If, in step S902, the KeyID set in the JWS access token matches the KeyID of a public key held by the resource server, the process moves to step S807, and the JWS access token is verified.

Combining the verification methods described in the second embodiment and the third embodiment in this manner makes it possible to achieve a combination of the effects of those embodiments. In other words, server queries can be handled according to the time at which the token was issued, even for a JWS access token having a KeyID issued by the authorization server. This makes it possible to more efficiently reduce the number of queries made to the authorization server. Note that step S803 may be moved to between steps S902 and S903. In other words, according to the present embodiment, if the signed token is from earlier than the time at which the last key was obtained, and if the verification of the KeyID, i.e., the key identification information, is a success, the access token is obtained from the authorization server regardless of the order in which those determinations are made.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-162103, filed Aug. 30, 2018 which is hereby incorporated by reference herein in its entirety.

What is claimed is:

1. An information processing apparatus, as a resource server, that performs verification of a signed token, the information processing apparatus comprising:
    a storage holding first key information for the verification;
    at least one memory storing instructions, and
    at least one processor to execute the instructions to cause the information processing apparatus to:
    receive a signed token;
    obtain second key information from an authorization server that provides the second key information, if key information for the received signed token is not held in the storage;
    hold the second key information in the storage; and
    perform, if the key information for the received signed token is held in the storage, the verification of the received signed token using the key information,
    wherein if the verification of the signed token received along with a request has succeeded, a resource is provided in response to the request.

2. The information processing apparatus according to claim 1, wherein, if the key information for the received signed token is not held in the storage and the received signed token was issued after an obtainment time of the first key information, the second key information is obtained from the authorization server, and
    wherein the instructions further cause the information processing apparatus to save an obtainment time at which the second key information was obtained from the authorization server.

3. The information processing apparatus according to claim 1,
    wherein the received signed token includes identification information of key information, and
    wherein, if the key information for the received signed token is not held in the storage and the identification information included in the received signed token has been issued by the authorization server, the second key information is obtained from the authorization server.

4. The information processing apparatus according to claim 1,
    wherein the information processing apparatus is connected to the authorization server and a client that sends the request for the resource along with the signed token provided by the authorization server.

5. A signed token verification method carried out by an information processing apparatus that performs verification of a signed token as a resource server, the method comprising:
    holding first key information for the verification in a storage;
    receiving a signed token;
    obtaining second key information from an authorization server that provides the second key information, if key information for the received signed token is not held in the storage;
    holding the second key information in the storage; and
    performing, if the key information for the received signed token is held in the storage, the verification of the received signed token using the key information,
    wherein if the verification of the signed token received along with a request has succeeded, a resource is provided in response to the request.

* * * * *